US00RE42304E

(19) United States
(12) Reissued Patent
Frank et al.

(10) Patent Number: US RE42,304 E
(45) Date of Reissued Patent: Apr. 26, 2011

(54) LOCK OUT TAG

(75) Inventors: Carl Frank, Mt. Pleasant, IA (US); Virgil Allen Watson, Salem, IA (US); Jason Bender, Mt. Pleasant, IA (US)

(73) Assignee: Lomont Molding, Inc., Mount Pleasant, IA (US)

(21) Appl. No.: 12/796,815

(22) Filed: Jun. 9, 2010

Related U.S. Patent Documents

Reissue of:
(64) Patent No.: 7,624,525
Issued: Dec. 1, 2009
Appl. No.: 11/277,007
Filed: Mar. 20, 2006

(51) Int. Cl.
*G09F 3/14* (2006.01)

(52) U.S. Cl. ..... 40/664; 40/5

(58) Field of Classification Search ..... 40/664, 40/330, 630, 631, 6, 661.12, 655
See application file for complete search history.

(56) References Cited

U.S. PATENT DOCUMENTS 262,696 A * 8/1882 Russell ..... 40/6
736,299 A 11/1903 Rose
1,089,956 A * 3/1914 Polyanich ..... 40/665
2,571,349 A 10/1951 Eckles
2,811,797 A * 11/1957 Teetor ..... 40/653
3,581,347 A 6/1971 Verspieren
3,913,179 A * 10/1975 Rhee ..... 24/16 PB
4,570,368 A * 2/1986 Stover ..... 40/645
4,807,379 A * 2/1989 Blumhof ..... 40/653
5,189,761 A 3/1993 Chisholm
5,381,617 A * 1/1995 Schwartztol et al. ..... 40/6
5,581,850 A 12/1996 Acker
5,687,455 A 11/1997 Alexander
5,692,268 A 12/1997 Case
5,765,885 A 6/1998 Netto
5,881,582 A 3/1999 Monaco
6,226,839 B1 5/2001 Sayegh
6,276,029 B1 8/2001 Buettell
6,513,349 B1 2/2003 Miao
6,671,984 B2 * 1/2004 Larson ..... 37/404
6,694,655 B2 * 2/2004 Redburn et al. ..... 40/664
2003/0182766 A1 10/2003 Avinger
2005/0268509 A1 12/2005 Lewis

* cited by examiner

*Primary Examiner* — Lesley Morris
*Assistant Examiner* — Shin Kim

(57) ABSTRACT

A tag has an in-mold graphic plate portion with a slot therein. Extending outwardly from the plate portion is an extension or tongue that has a neck and locking tip. The locking tip has an aperture adapted to receive a lock. The neck of the tongue is flexible such that the locking tip is received by and extends through the slot.

1 Claim, 2 Drawing Sheets

LOCK OUT TAG

Matter enclosed in heavy brackets [ ] appears in the original patent but forms no part of this reissue specification; matter printed in italics indicates the additions made by reissue.

BACKGROUND OF THE INVENTION

This invention is directed toward a tag, and more specifically a lock out tag for complying with OSHA regulations.

Lock out tags are known in the art to provide notice and authorization to specific individuals permitting removal of a lock from a secured area, such as an electrical switch/breaker box. Standard lock out tags are sold having separate pieces. Presently, a need exists for an all-in-one tag having a strap that conveniently receives a loc and provides an in-mold graphic.

An object of the present invention is to provide a tag that is easy to use.

A further object of the present invention is to provide a tag that is economical to manufacture.

These and other objects will be apparent to those skilled in the art based on the following written description.

BRIEF SUMMARY OF THE INVENTION

A tag has an in-mold graphic plate portion with a slot therein. Extending outwardly from the plate portion is an extension or tongue that has a neck and locking tip. The locking tip has an aperture adapted to receive a lock. The neck of the tongue is flexible such that the locking tip is received by and extends through the slot.

DETAILED DESCRIPTION OF THE PREFERRED EMBODIMENT

Figure 1:
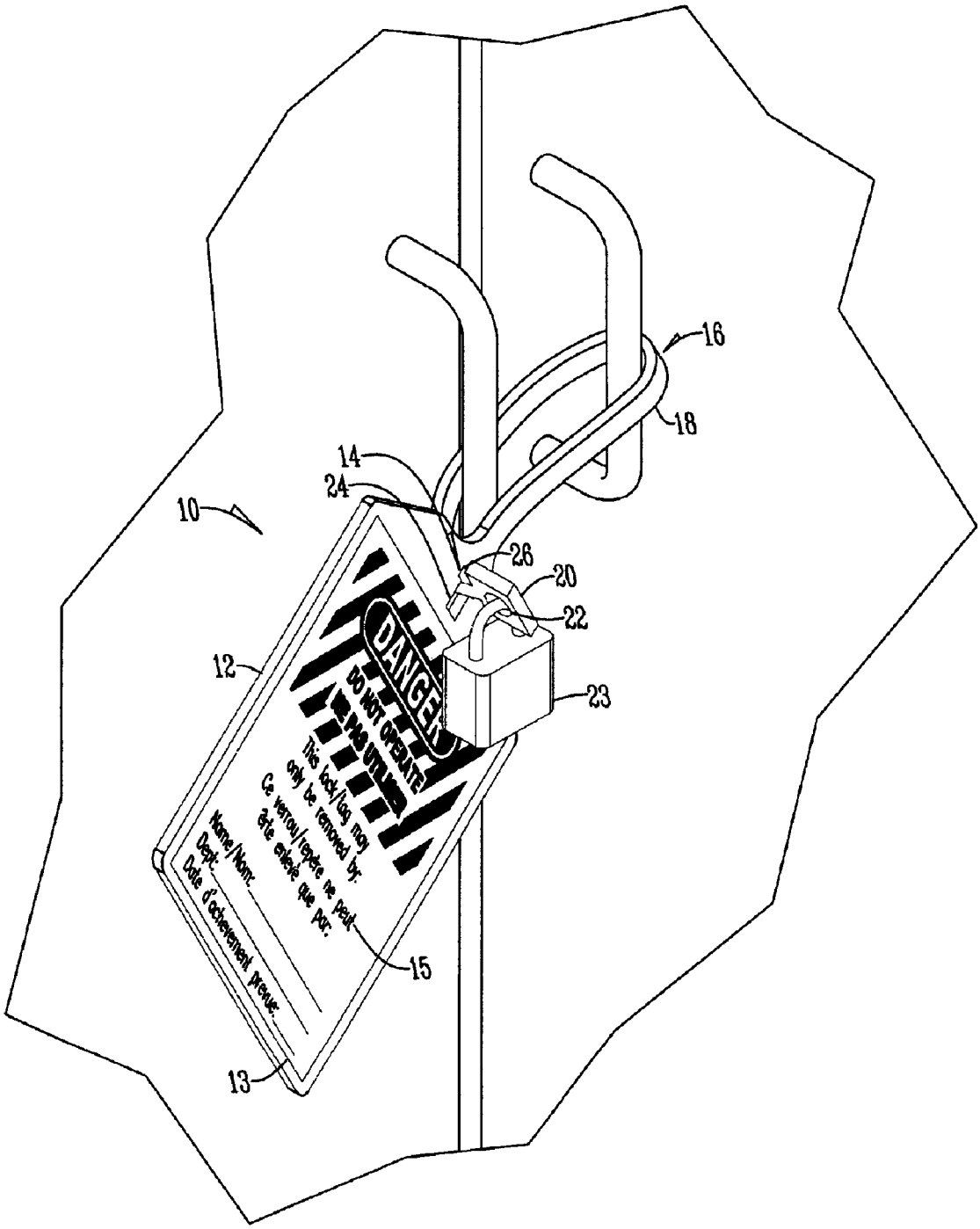
FIG. 1 is a perspective view of a tag and a lock.
Figure 2:
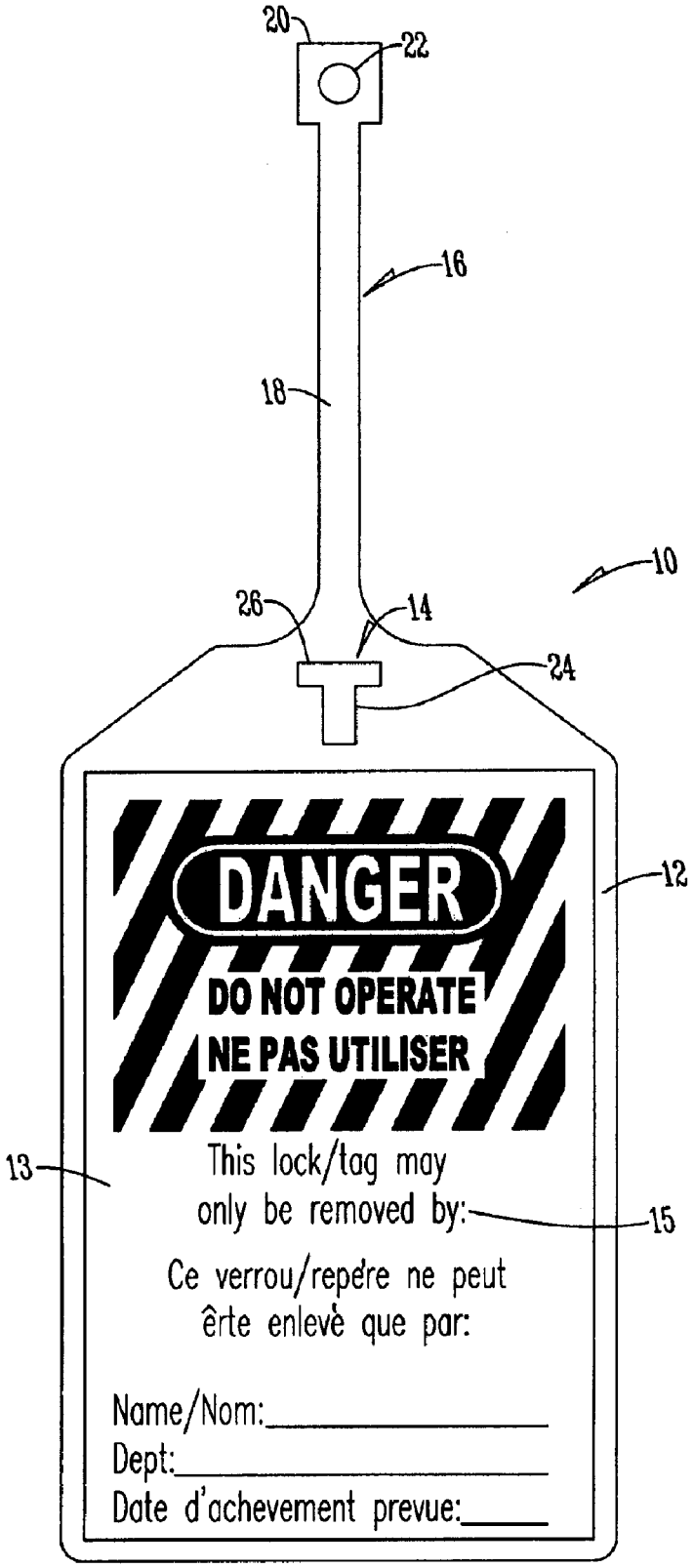
FIG. 2 is a top plan view of a tag.

Referring to the figures, a tag 10 has a plate portion 12. Molded within the plate portion 12 is a sheet 13 having a graphics and printed indicia 15. The graphics and indicia 15 may include a warning as well as information indicating the individual authorized to remove the tag 10.

Extending through the plate 12 is a slot 14. While the slot is of any shape and size, preferred is a T-shaped slot. Extending outwardly from the plate portion 12 is an extension or tongue 16. The tongue 16 has a neck portion 18 and a locking tip 20. The locking tip 20 is formed to be received within the slot 14 such that once the tip 20 passes through the slot and is twisted the tip 20 is retained by the tip 20 engaging a surface of the plate portion 12. The neck 18 is made of a flexible material such that the neck 18 may be bent to permit the tip 20 to be received by and pass through the slot 14. The locking tip 20 has an aperture 22 adapted to receive a lock 23, such as a conventional padlock.

In use, a tag 10 is provided and the tongue 16 is bent around an object so that the locking tip 20 is received by and passes through the slot 14. In the embodiment shown in the drawings, the neck 18 is bent and twisted such that the tip 20 slides through the narrow section 24 of the T-shaped slot 14. Once through the slot 14, when the neck 18 is permitted to untwist, the neck 18 is received in the transverse section 26 of the slot 14, such that an edge of the tip engages a surface of the plate portion 12. Once the tip 20 is retained, the lock 23 is inserted through aperture 22 and locked in place.

From the foregoing, a tag has been shown that meets at least all the state objectives.

What is claimed is:

1. A method of securing an object, comprising the steps of:

providing a tag having an elongate, in-mold plastic plate portion, a slot, and a flexible tongue wherein the tongue further comprises a neck portion that extends outwardly from the plate portion and a locking tip extending from the neck portion; wherein the neck portion is narrower than the tongue and locking tip and wherein the locking tip has a centrally located aperture adapted to receive a lock;

bending the tongue around an object to be secured;

engaging the locking tip and the slot;

twisting the tongue so that the locking tip is received by and passes through the slot; and inserting a lock through the aperture.

* * * * *